(12) United States Patent
Wall et al.

(10) Patent No.: US 7,878,575 B1
(45) Date of Patent: Feb. 1, 2011

(54) TRAILER WITH SLIDING SAFETY DOOR (75) Inventors: Roy Wall, P.O. Box. 931, Hamilton, MT (US) 59840; Tonja Wall, Hamilton, MT (US)

(73) Assignee: Roy Wall, Hamilton, MT (US)

( * ) Notice: Subject to any disclaimer, the term of this patent is extended or adjusted under 35 U.S.C. 154(b) by 133 days.

(21) Appl. No.: 12/369,718

(22) Filed: Feb. 11, 2009

Related U.S. Application Data (60) Provisional application No. 61/027,806, filed on Feb. 11, 2008.

(51) Int. Cl.
*E05D 15/08* (2006.01)
*B60J 5/12* (2006.01)

(52) U.S. Cl. .......................... 296/155; 49/125; 49/409; 160/197; 296/24.31; 296/146.8; D12/196

(58) Field of Classification Search .................... 49/61, 49/63, 98, 103, 125, 409, 410, 411; 160/194, 160/196.1, 197, 201, 202, 205; 296/24.3, 296/24.31, 50, 146.1, 146.8, 155, 182.1, 296/186.3; D12/101, 102, 196
See application file for complete search history.

(56) References Cited

U.S. PATENT DOCUMENTS

| | | | | | |
|---|---|---|---|---|---|
| 894,002 | A | * | 7/1908 | Hill | 16/90 |
| 908,199 | A | * | 12/1908 | Birney | 105/343 |
| 925,234 | A | * | 6/1909 | Schnepf | 16/88 |
| 2,604,162 | A | * | 7/1952 | Hickling et al. | 160/201 |
| 2,878,054 | A | * | 3/1959 | Linder | 296/190.11 |
| 3,327,428 | A | * | 6/1967 | Horton et al. | 49/177 |
| 3,705,468 | A | * | 12/1972 | Ashworth | 49/409 |
| 4,116,135 | A | * | 9/1978 | Jaekle et al. | 410/26 |
| 4,302,044 | A | * | 11/1981 | Sims | 296/186.4 |
| 4,336,670 | A | * | 6/1982 | Brutosky | 49/409 |
| 4,416,482 | A | * | 11/1983 | Patterson | 296/3 |
| 4,530,538 | A | * | 7/1985 | Greene et al. | 296/24.31 |
| 4,633,614 | A | * | 1/1987 | Van Weelden | 49/409 |
| 4,635,699 | A | * | 1/1987 | Kauffman et al. | 160/211 |
| 4,982,833 | A | * | 1/1991 | Straight et al. | 198/778 |
| 6,082,499 | A | * | 7/2000 | O'Donnell | 187/324 |
| 6,158,123 | A | * | 12/2000 | Bryson | 29/898.03 |
| 7,174,944 | B1 | * | 2/2007 | Clark et al. | 160/197 |
| 7,653,966 | B2 | * | 2/2010 | Quinn et al. | 16/96 R |
| 2006/0197357 | A1 | * | 9/2006 | Catania | 296/155 |

FOREIGN PATENT DOCUMENTS

| EP | 12453 A1 | * | 6/1980 |
|---|---|---|---|
| EP | 829607 A2 | * | 3/1998 |
| JP | 06008102 A | * | 1/1994 |
| JP | 3147756 U | * | 1/2009 |

\* cited by examiner

*Primary Examiner*—Glenn Dayoan
*Assistant Examiner*—Paul A Chenevert
(74) *Attorney, Agent, or Firm*—Gary Hoenig (57) ABSTRACT

A livestock trailer with sliding safety door having a trailer with a two section sliding door mounted at the rear and hung from a slidable rail assembly at the top and retained by a guide at the bottom wherein the guides are steel reinforced. The sliding safety door, being secured at top and bottom, facilitates the loading and unloading of livestock by minimizing injuries sustained from kicking the door and eliminating injuries sustained when utilizing prior art swinging door type livestock trailers. The sliding door mechanism further eliminates the need to reposition the trailer while docking to a loading ramp so as to provide clearance to operate the door.

1 Claim, 7 Drawing Sheets

TRAILER WITH SLIDING SAFETY DOOR

This application claims the benefit of U.S. provisional patent application Ser. No. 61/027,806, filed Feb. 11, 2008.

FIELD OF INVENTION

The present invention generally relates to the field of livestock hauling trailers; and, more particularly, to a stock trailer with reinforced sliding door mechanisms thereby enhancing safety during handling of livestock.

BACKGROUND OF THE INVENTION

A major hazard encountered during the handling of livestock occurs when animals are loaded onto stock trailers for transport. Prior art livestock trailers incorporate swinging doors on the rear and sides of the trailer. When livestock is loaded on to the trailer, the rear loading door, which swings from hinges at the side of the trailer, is pushed closed by the operator. As the door closes, animals often panic as the light diminishes from the outside and the interior of the trailer darkens. Consequently, the animals tend to kick at the door. An operator, unprepared for a kick and not being able to see into the trailer to observe the kick, is thrust back often resulting in serious injuries. Similar injuries can occur during unloading.

Some livestock loading and unloading situations require the livestock trailer to be backed up against a loading ramp or other dock. Prior art trailers incorporating swinging doors require the livestock trailer to be positioned at a distance from the ramp in order to establish clearance from the ramp to open or close the door thereby requiring multiple operators to maneuver the trailer and to monitor livestock in the trailer while the trailer is repositioned.

What is needed is an improved livestock trailer and door mechanism to reduce injuries endured during loading and unloading livestock such that the operator can, as a minimum, observe the animals and to provide a means for operating the door mechanism when docked to a loading ramp.

SUMMARY OF THE INVENTION

Accordingly, the present invention is directed to a new livestock trailer, and, more specifically, to a livestock trailer incorporating a reinforced sliding door mechanism, thereby substantially obviating one or more of the problems due to the limitations and disadvantages of the related art.

The present invention is a livestock trailer comprising a steel reinforced sliding door mechanism permitting an operator to continuously observe the livestock during loading and to prevent injuries from kicking.

A slidable two piece door mechanism is fixed at the top of the rear of a stock trailer by a slidable rail assembly wherein each door section has a width of approximately half the width of the trailer. The door sections are interlocked such that as the doors are opened from left to right the first door section slides to the right until the left half of the trailer is open and then interlocking with the second door section, both continue to slide to the right until the trailer is fully open. The bottom of the door sections are retained by reinforced guides at the bottom of the trailer opening such that when an animal kicks the doors remain in place as the guides prevent the door sections from swinging outwardly and upwardly. To operate the sliding safety door, the operator first slides open the first door section while being protected by the door section, then the second door section again protected by the door; and, in this manner, is protected from injury. As the door is slidable towards the side of the trailer, the door is operable whilst docked to a loading ramp thereby eliminating the step of repositioning the trailer to facilitate opening the door.

BRIEF DESCRIPTION OF THE DRAWINGS

The accompanying drawings, which are incorporated in and constitute a part of this specification illustrate embodiments of the invention and, together with the description, serve to explain the features, advantages, and principles of the invention.

In the drawings.

DETAILED DESCRIPTION OF THE INVENTION

Although particular embodiments of the invention have been described in detail for purposes of illustration, various modifications may be made without departing from the spirit and scope of the invention. Accordingly, the invention is not to be limited except as by the appended claims. Referring now in greater detail to the various figures of the drawings wherein like reference characters refer to like parts, there is shown in a perspective view at 10 in FIG. 1, a new type of livestock trailer having a reinforced sliding safety door for enhanced operator safety.

Figure 1:
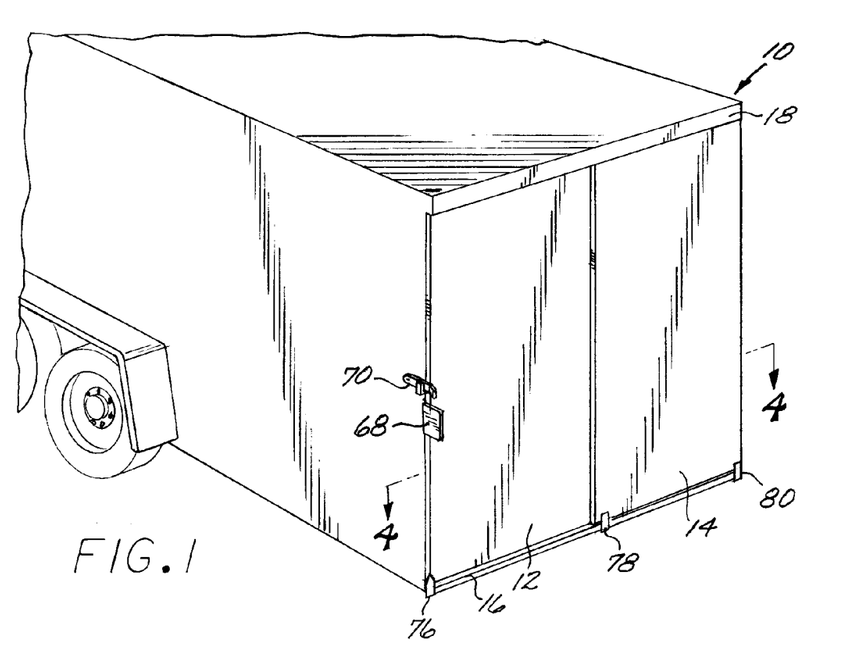
FIG. 1 is a rear perspective view of the livestock trailer with sliding safety door according to the present invention wherein the rear sliding door is closed.
Figure 2:
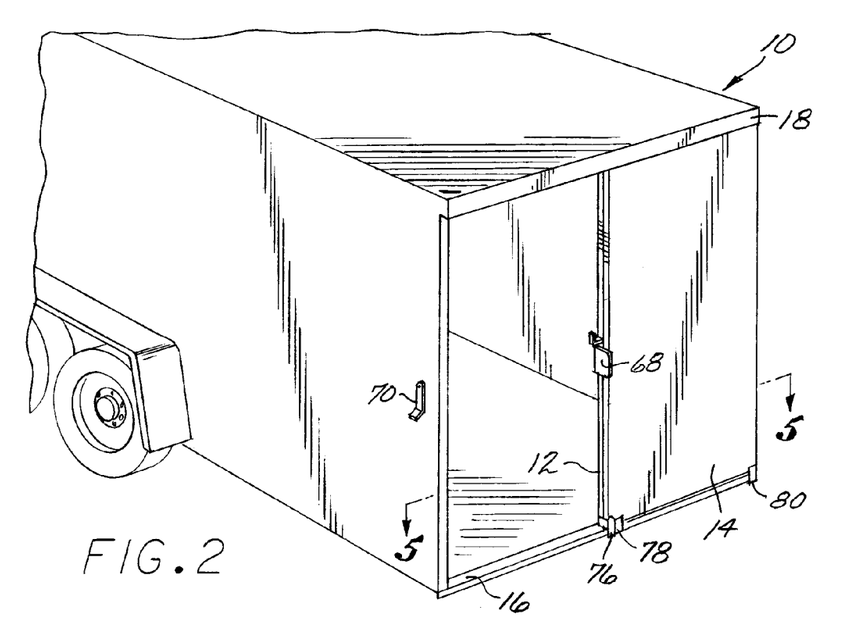
FIG. 2 is a rear perspective view, similar to FIG. 1, wherein the first door section is fully open.

As illustrated in FIG. 1, the sliding safety door is comprising a first and left door section 12 and a second and right door section 14 wherein each door slides and is hung from the slidable rail assembly 18 and is prevented from being pushed out from the trailer by the lower door guide 16. When opening the safety door, the first door section 12 is slid to the right behind the second door section until the first door section 12 is fully open as illustrated in FIG. 2. The operator stands behind the first door section 12 and pulls the first door section 12 open to begin the disembarkment of the livestock. As the door section 12 is pulled open, the animals tend to kick at the door as light enters the trailer. Because the door sections are retained by the slidable rail assembly 18 at the top and the lower door guide 16 at the bottom of the doors, the operator is safely positioned with the door sections between the operator and the animals. Further, because the doors are secured top and bottom, the operator may confidently anticipate that no injuries will occur if the animals kick the door. Note the handle 68 fixed to the first door section and latch 70 fixed to the trailer. The handle 68 and latch 70 are optionally provided for convenience of handling and security.

Figure 3:
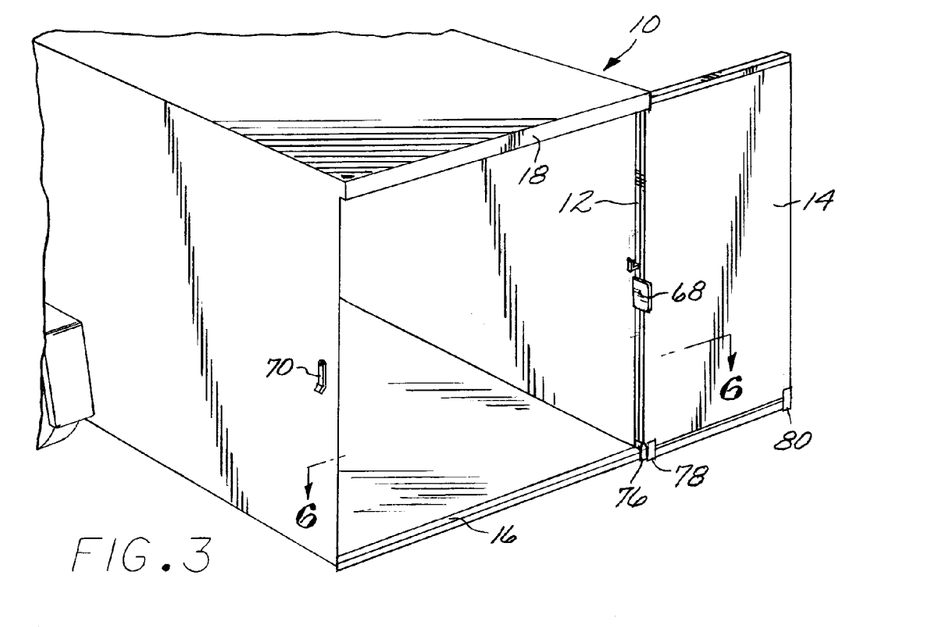
FIG. 3 is a rear perspective view, similar to FIGS. 1 and 2, wherein the first and second door sections are both fully open.

Referring now to FIG. 3, showing the both door sections 12 and 14 fully open, the first door section 12 is slid behind the second door section 14. Both door sections are supported from the top by portions of the slidable rail assembly 18. The bottom ends of the door sections are retained by the lower guide 16.

Figure 4:
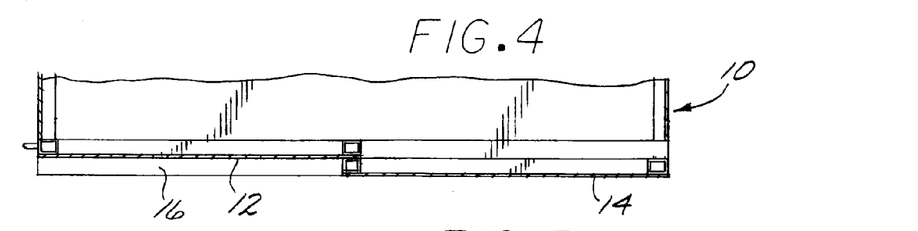
FIG. 4 is a cross section view, taken on Line 4-4 of FIG. 1, illustrating the sliding safety door according to the present invention fully closed.
Figure 5:
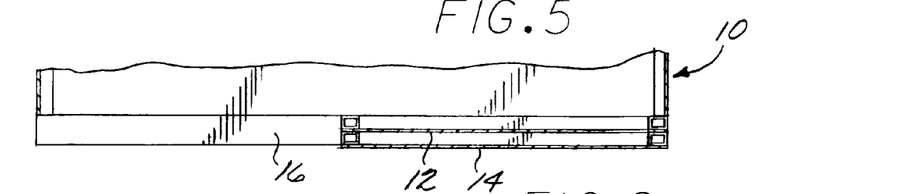
FIG. 5 is a cross section view, taken on Line 5-5 of FIG. 2, illustrating the interlocking of the first door section with the second door section.
Figure 6:
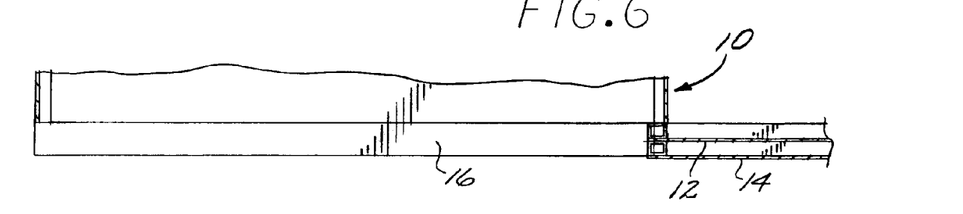
FIG. 6 is a cross section view, taken on Line 6-6 of FIG. 3, showing both door sections fully open.

Referring to FIGS. 4, 5, and 6, showing cross sections of the door section in the open, partially open and fully open positions, note that the first door section 12 is positioned behind the second door section 14. As the first door section 12 slides open the first door section 12 interlocks with the second door section 14 at the position where the first door section 12 is open as shown in FIG. 5. Any further motion to open the safety door further results in both door sections 12 and 14 to travel together to eventually be located in the fully open position shown in FIG. 6.

Figure 7:
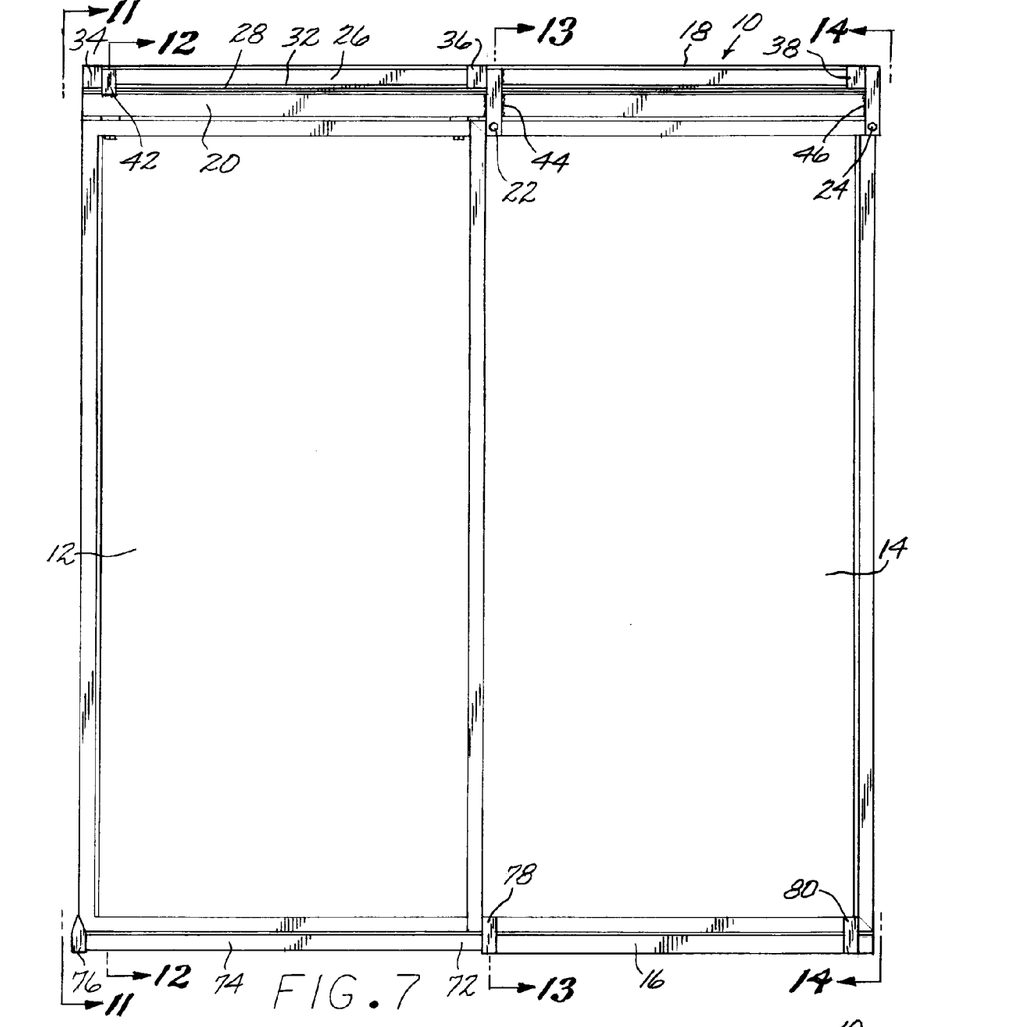
FIG. 7 is a rear elevation view of the livestock trailer sliding safety door fully closed.

Referring to FIG. 7, a rear elevation view of the sliding safety door incorporated into the rear of the livestock trailer, the slidable rail assembly 18, from which both door sections are hung, is shown mounted at the top of the rear of the trailer. The slidable rail assembly 18 is comprising a square tubular steel door rail 26 resting upon a polymer guide pad 32 secured the trailer mounting flange 28. The polymer guide pad 32 runs the length of the door rail 26 where feasible so as not to obstruct other features and is fixed to the trailer mounting flange 28. The polymer guide pad 32 facilitates the sliding of the door rail 26 along the length of the trailer mounting flange 28. The trailer mounting flange 28 is an L shaped metal bracket with both face widths approximately of the width of the second square tubular steel door rail 26, a length of the trailer opening and one face is welded upwardly along the length to the top of the trailer opening with the opposing perpendicular face directed outwardly from the rear of the trailer so as to provide a shelf structure being the principle support for the sliding safety door. A typical trailer rear opening usually comprises a trailer upper 60 and lower 62 rear mounts as illustrated in FIGS. 11, 12, 13 and 14. If these mounts are not present, the rear mounts must be added to the trailer in order to incorporate the sliding safety door.

The second door rail 26 of the slidable rail assembly 18 is retained in position by three rail guides 34, 36 and 38. The rail guides are constructed from square tubular metal material having internal dimensions to compliment the external dimensions of the door rail 26 thereby each providing a guide through which the door rail 26 may slide. It will be appreciated that the polymer guide pad 32 thickness is slightly thicker than the thickness of the rail guides such that the door rail 26 rests primarily upon the polymer guide pad 32. The rail guides 34, 36 and 38 are welded to the top of the rearward extending face of the trailer mounting flange 28. Guide 34 is positioned at the left, guide 36 is welded in the center and guide 38 is welded near the right end at a distance to the left from the right end so as to permit clearance for the second door section 14 track T bracket 46 from which the second door section 14 hangs.

Still referring to FIG. 7, the first door section 12 is suspended by rollers 52 and 54 in a roller track 20 portion of the slidable rail assembly 18 wherein the roller track 20 is formed as a downwardly facing U section with the edges rolled inwardly to conform to and retain the wheels of the rollers leaving a slot along the length of the track for the hanger sections, 56 and 58, of the rollers from which the first door section 12 is hung. The roller track 20 has the same length as the second door rail 26 and is attached to the rail 26 by roller track L bracket 42 and track T brackets 44 and 46.

Figure 12:
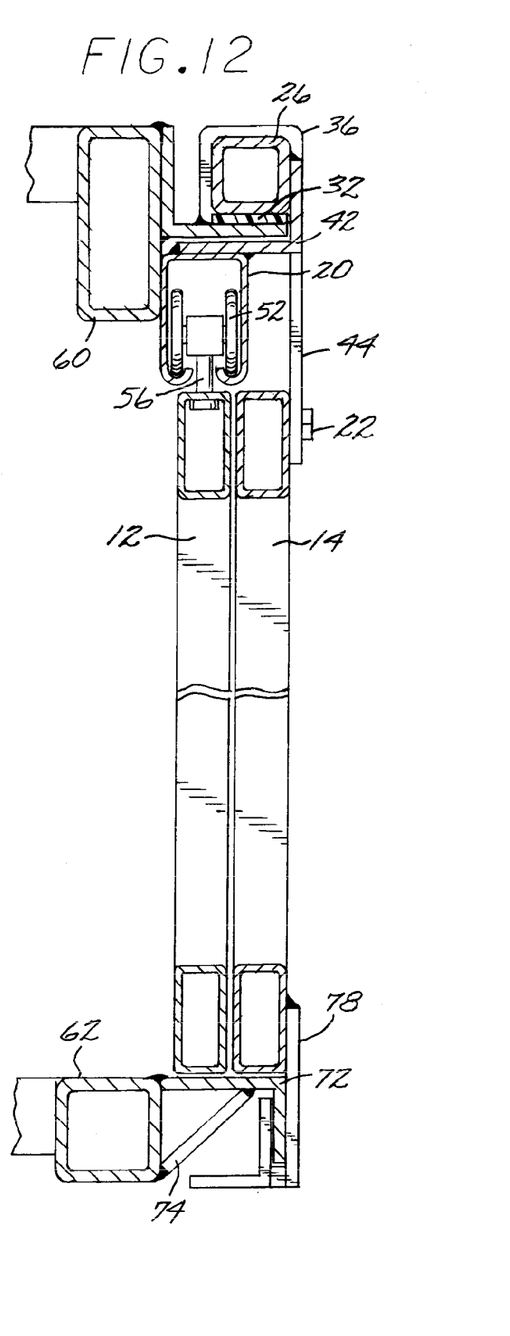
FIG. 12 is a cross section view, taken on Line 12-12 of FIG. 7, showing the door rail resting on the truck mounting flange which supports the sliding safety door according to the present invention.
Figure 13:
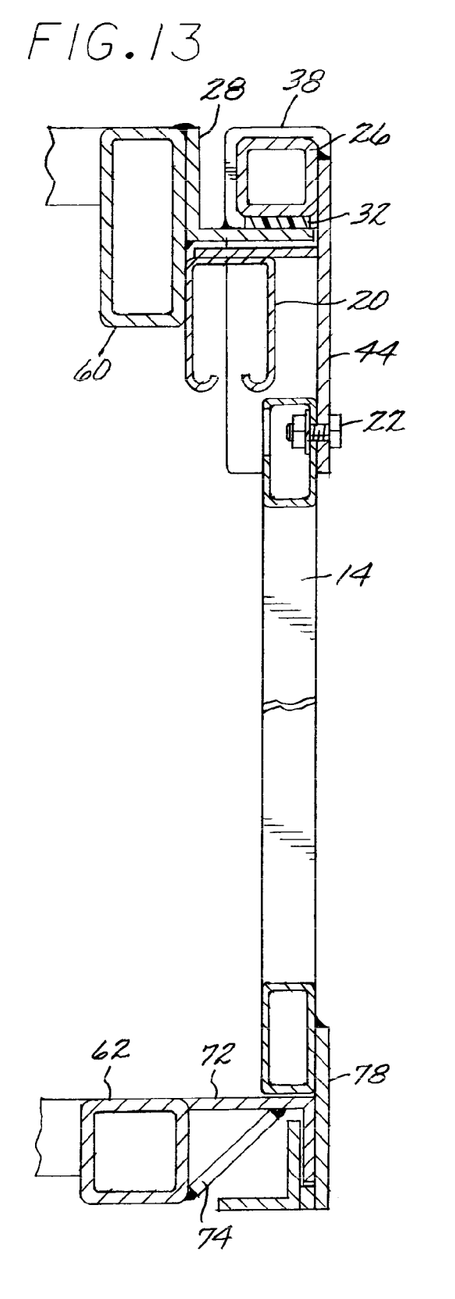
FIG. 13 is a cross section view, taken on Line 13-13 of FIG. 7, showing details of the hanger system for the second door section.
Figure 14:
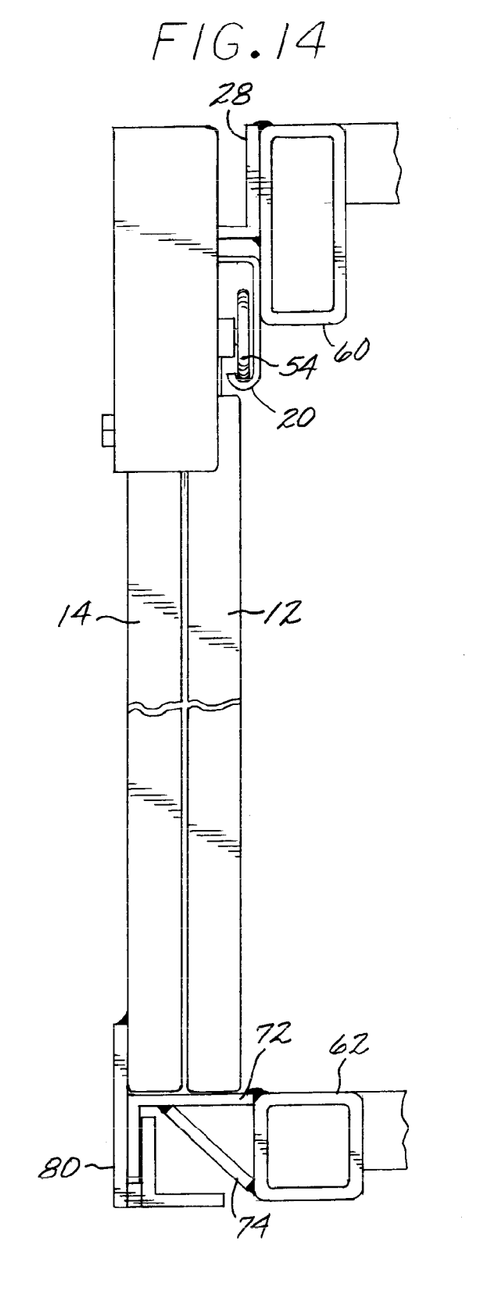
FIG. 14 is a right side elevation view, taken on Line 14-14 of FIG. 7, according to the present invention.

Referring briefly to FIG. 12, a side elevation cross section view of the left side of the sliding safety door taken along Line 12-12 of FIG. 7, the upwardly facing portion of the roller track L bracket 42 is welded to the rearward facing surface of the door rail 26 with the opposing perpendicular L portion positioned inwardly and under the trailer mounting flange 28. The roller track 20 is positioned toward the trailer to permit clearance for the first door section 12 to pass behind the second door section 14 and is welded to the bottom of the roller track L bracket 42 inwardly facing portion. Similarly, as illustrated in FIG. 13, a similar cross section view taken along Line 13-13 of FIG. 7, the roller track 20 is welded to the bottom of the T section of the track T brackets 44 and 46 wherein the upwardly extending portions of the track T brackets are similarly welded to the rail 26. The downwardly extending portion of the T brackets form straps from which the second door section 14 is hung and secured by second door section fasteners 22 and 24.

Figure 8:
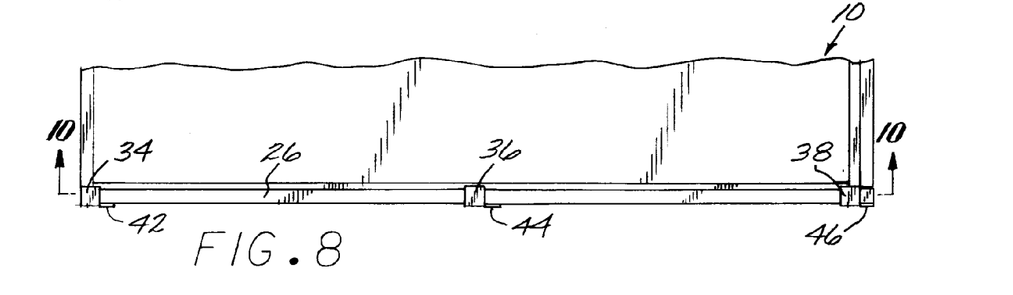
FIG. 8 is a top plan view of the sliding safety door portion of the livestock trailer showing the door fully closed as in FIG. 7.
Figure 9:
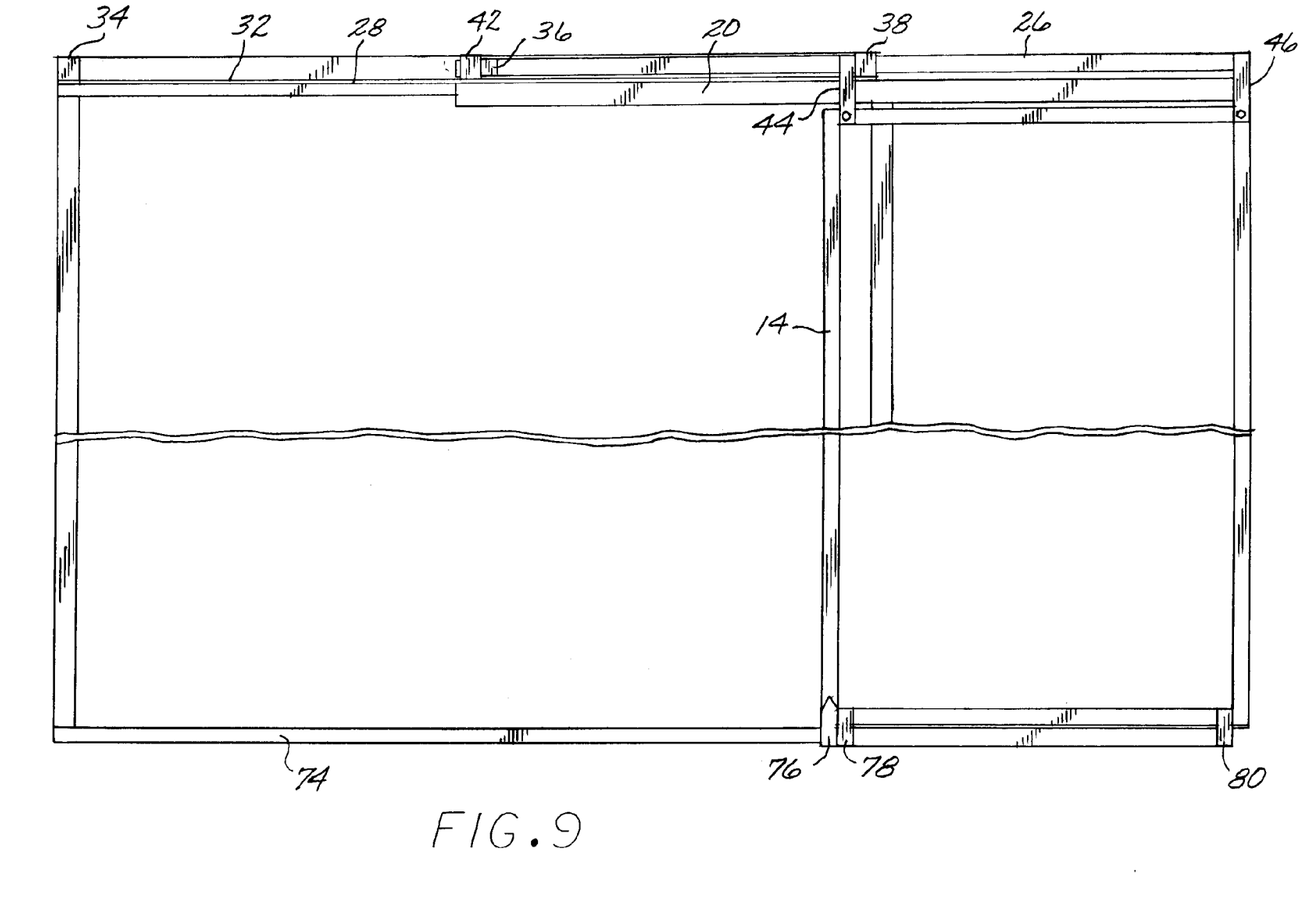
FIG. 9 is a rear elevation view of the livestock trailer sliding safety door fully open.

As shown in FIG. 8, a top plan view of the sliding safety door, the rail guide 34 is positioned at the far left of the assembly and acts as a stop for the first door section roller track L bracket 42 when the first door section 12 is closed by sliding the door rail 26 to the closed position. Similarly, rail guide 36 also provides a stop for the track T bracket 44, which supports the roller track 20 and as a hanger strap for the second door section 14 thereby defining the closed position of the second door section 14. The rail guide 36 also provides a stop for the roller track L bracket 42 when the sliding safety door is fully open as in FIG. 9 where the roller track L bracket 42 is stopped by rail guide 36. Also note in FIG. 9 that the track T bracket 44 is also stopped by rail guide 38 on the left. In this manner the sliding safety door is prevented from sliding off the trailer mounting flange 28.

Figure 10:
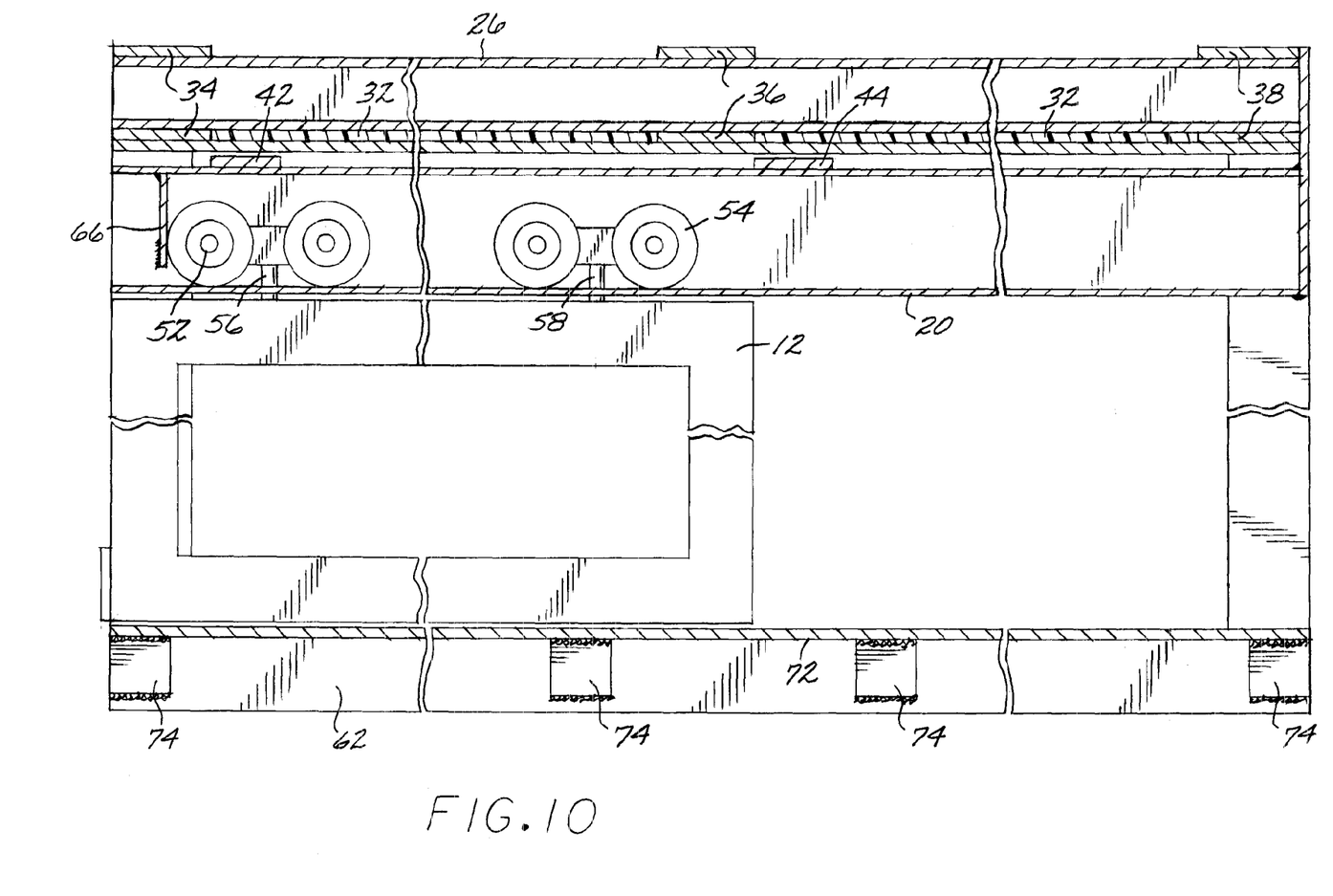
FIG. 10 is a cross section view, taken on Line 10-10 of FIG. 8, illustrating the roller mechanisms upon which the doors hang.
Figure 11:
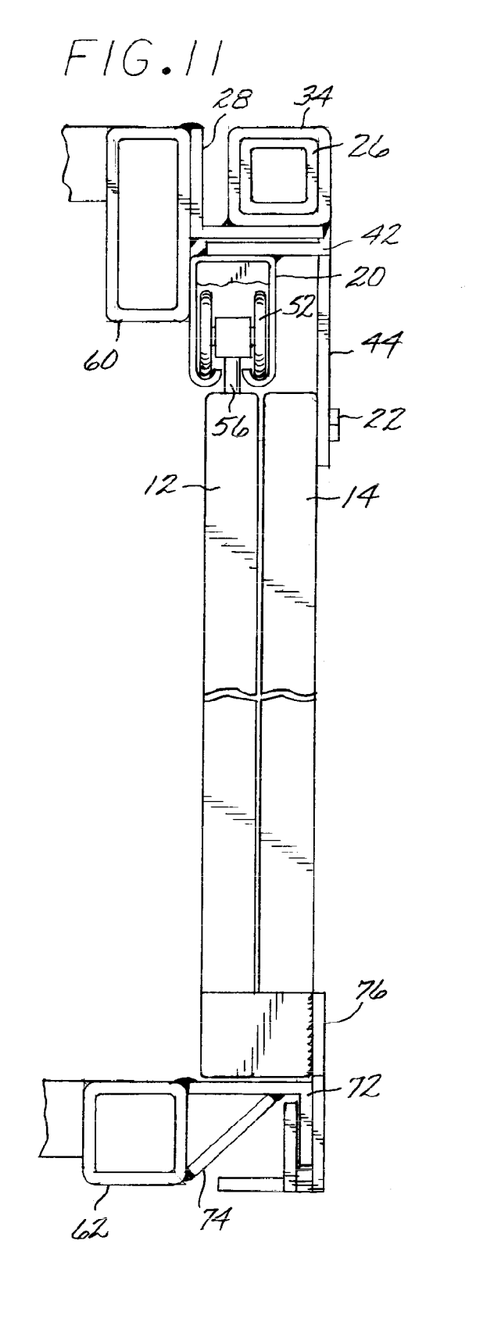
FIG. 11 is a left side elevation view, taken on Line 11-11 of FIG. 7, showing details of the slidable rail assembly construction.

In FIG. 10, a cross section view of the door taken along Line 10-10 of FIG. 8, more clearly details the various elements of the sliding safety door while in the fully closed position. Note the rollers 52 and 54 resting in the roller track 20 with roller hanger sections 56 and 58 supporting the first door section 12 at the top of the door. In the illustrated embodiment, a roller track end stop 66 is incorporated to prevent the first door section from rolling out of the track 20; however, this element is optional. The roller track 20 is welded to the L bracket 42 and T brackets 44 and 46 which, in turn, are welded to the rearward face of the door rail 26. The rail guides 34, 36 and 38 can be seen surrounding the door rail 26 and being welded to the truck mounting flange 28 with polymer guide pad 32 material between the door rail 26 and the truck mounting flange 28.

The bottom ends of the door sections are retained by lower door guide 16 assembly. The function of the lower door guide 16 assembly is to provide a track in which the door sections slide while also preventing the bottom ends of the door sections from being pushed out resulting in the bottoms swinging out from the slidable rail assembly 18. Referring to FIGS. 11, 12, 13 and 14, the lower door guide 16 assembly is comprising a lower door rail 72 constructed of L shaped angle iron dimensioned in length to match the trailer width and welded to the trailer's rear lower mount 62 to form an extension of the trailer floor with the opposing perpendicular face directed downward as shown. The rail 72 is additionally supported by cross members 74 welded at angle between the rear lower mount 62 and the interior of the rail 72. The combination lower door rail 72 and cross member supports 74 form a downward facing element along the rear of the trailer rear bottom forming a track for lower door track receivers 76, 78 and 80. The lower door track receivers are constructed of angle iron and flat strips so as to form a slot to receive the lower door rail wherein receivers 78 and 80 are welded to the outward facing bottom portion of the second door section 14. Note that the receiver 76 additionally comprises a vertical plate perpendicularly fixed to the receiver and is welded to the left edge of the first door section 12 as the first door section is positioned behind the second door section 14.

The various elements of the present invention may be constructed of any suitable material; however, elements except otherwise specified are preferably manufactured from a high strength steel alloy so as to withstand blows from livestock thereby assuring the safety of the operator.

What is claimed is:

1. A trailer with sliding safety door comprising a livestock trailer, a slidable rail assembly fixed to the top of the rear opening of the trailer having a door rail resting on a polymer guide pad fixed to a flange mount top surface extending to the rear and a roller track positioned below the flange mount and fixed to the door rail by brackets thereby provide an assembly capable of sliding along the flange mount from trail side to side, a lower door guide fixed to the bottom of the rear opening of the trailer providing a lower door rail, a first door section hung by rollers residing in the roller track, a second door section hung from the door rail, rail guides fixed to the flange mount and surrounding the door rail so as to contain the motion of the rail; and, rail receivers fixed to the bottom of the doors and receiving the lower door rail so as to provide a guide wherein the elements, in combination, provide a two section door capable of sliding open with the first door section interlocking into the second door section as the rear opening of the trailer is fully opened.

* * * * *